UNITED STATES PATENT OFFICE 2,348,976

INSECTICIDE

Julius Hyman, Chicago, Ill., assignor to Velsicol Corporation, Chicago, Ill., a corporation of Illinois No Drawing. Application January 29, 1943, Serial No. 473,961

11 Claims. (Cl. 167—30)

This invention relates to novel insecticides and particularly to a class of compounds found to possess insecticidal potency of a comparatively high order and useful in relatively small proportion in the preparation of compositions of a toxic and repellant nature to a great variety of insects and allied forms of life.

More specifically my invention relates to the use of one or more methylated 1,4-naphthoquinones as an active ingredient in an insecticidal composition, which may include a solubilizing material therefor and a conventional carrier or base, and wherein the methylated 1,4-naphthoquinone may be the prime active ingredient or may be in additive or synergistic association with other materials having greater or lesser insecticidal potency. The methylated 1,4-naphthoquinones which I have found useful as aforesaid, and as hereinafter more fully set forth, have the following structural formula:

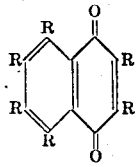

where R may be either hydrogen or a methyl ($CH_3$) group, but where at least one R is a methyl group. A typical example of such a compound is 2-methyl-1,4-naphthoquinone, known as pro-vitamin K, which possesses the following structure:

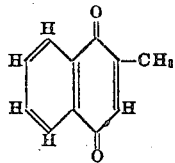

These naphthoquinones are yellow crystalline solids, and are most readily prepared by the action of chromic oxide ($CrO_3$) on methylated naphthalenes in acetic acid solution. In making the 1,4-naphthoquinones, it is necessary that the 1,4 positions on the original methylated naphthalene be unsubstituted. The manufacture of 2-methyl-1,4-naphthoquinone has been described repeatedly in the prior art and literature, and the homologous naphthoquinones may be produced similarly, with satisfactory yields.

The insecticidal value of these compounds does not however appear to be related to their vitamin K activity, inasmuch as, for example, 2,6- dimethyl-1,4-naphthoquinone having the following structural formula:

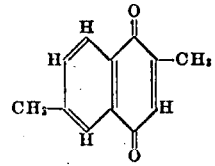

which is said to possess very little vitamin K activity, shows an insecticidal action somewhat superior to that of pro-vitamin K itself.

On the other hand, while 2-methyl-1,4-naphthoquinone oxide and 2-methyl-1,4-naphthohydroquinone diacetate, having respectively the following structural formulas:

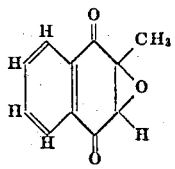 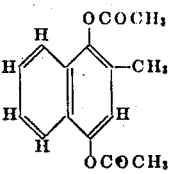

are both said to show high vitamin K activity, they have been found to possess insecticidal potency of only a comparatively low order. It will therefore be understood that the compounds which I have found to possess insecticidal potency of a comparatively high order, and whose use is contemplated herein, while structurally related to compounds of vitamin K activity are not necessarily related in the degree of their respective potency or activity.

I preferably use the methylated 1,4-naphthoquinones by dissolving them prior to use in a suitable solvent or solvents, such as for example pine oil, a higher boiling chlorinated hydrocarbon oil, or a hydrocarbon oil rich in mono- and di-methyl naphthalenes (known to the trade as Velsicol AR-50) or rich in di- and tri-methyl naphthalenes (known to the trade as Velsicol AR-60). I preferably use the latter hydrocarbon oils which are rich in methylated napthalenes by reason of the fact that they not only are good solubilizing agents but they are also active per se as insecticidal ingredients, as set forth in my co-pending application Serial No. 444,397.

In view of the fact that the contemplated napthoquinones are but slightly soluble in the conventional petroleum or kerosene insecticide bases, use is made of the foregoing or similar agents which are mutual solvents when such bases are used in forming the insecticidal composition.

If desired the naphthoquinones in question may be ground and used in connection with inert dusts, or they may be dissolved in suitable carriers and the solutions used to impregnate dusts. They may also be used with other known insecticidally active materials such as pyrethrum extract, rotenone, organic thiocyanates, etc., either in fortifying, synergistic or partial substituting relationship.

As an example of the action of methylated 1,4-naphthoquinones toward flies when tested by the Peet-Grady method, a mixture comprising 1% of 2-methyl-1,4-naphthoquinone (pro-vitamin K), 25% of Velsicol AR–50 and 74% of a so-called odorless petroleum insecticide base (Sonneborn's Deo-Base) or deodorized kerosene gave a 90% knock-down in 7½ minutes and a 24 hour mortality of 91%. Under the same conditions the Official Test Insecticide showed a 24 hour mortality of 48%, thus giving the aforementioned insecticidal naphthoquinone composition a Peet-Grady rating of +43.

Under the same conditions a mixture such as the above, but in which the pro-vitamin K had been replaced by 1,4-naphthoquinone showed a 90% knock-down time of over 10 minutes and a Peet-Grady mortality rating of +6. Like substitution of 1,2-naphthoquinone also showed poor knock-down and gave a Peet-Grady rating of −26.

As indicative of the high potency of the 2-methyl-1,4-naphthoquinone per se used in the first example, a check-run in which 25% of Velsicol AR–50 and 75% of Deo-Base only was used showed a slow knock-down and a Peet-Grady rating of −27.

When solutions comprising 3% of 2-methyl-1,4-naphthoquinone, 25% of AR–50 and 72% of Deo-Base were tested on German roaches (adult females) by means of a micro-syringe, it was found that 0.005 cc. per roach was sufficient to kill 40% of the roaches in 24 hours. Where 2,6-dimethyl-1,4-naphthoquinone was used in place of the pro-vitamin K, the same dosage produced a 90% mortality. On the other hand, the Official Test Insecticide distributed by the National Association of Insecticide and Disinfectant Manufacturers, Inc., showed a 20% mortality under similar conditions. The O. T. I. produced its usual rapid paralysis, but there was high recovery in this treatment.

I have also found that methylated 1,4-naphthoquinone insecticidal compositions appear to be quite toxic to agricultural pests. For example, a solution was made containing 80% by weight of Velsicol AR–60 and 20% by weight of 2-methyl-1,4-naphthoquinone. When 5% of this solution was mixed with 95% of pyrophyllite dust, the resulting mixture appeared to give good protection against Colorado potato beetle larvae, although the protection was not as good as that afforded by an equal quantity of derris resinate, assaying 25% rotenone. No foliage damage was observed.

I claim as my invention:

1. An insecticidal composition containing as an active ingredient 2,6-dimethyl-1,4-naphthoquinone dissolved in a solvent.

2. An insecticidal composition containing as an active ingredient 2-methyl-1,4-naphthoquinone dissolved in a solvent.

3. An insecticidal composition containing as an active ingredient a methylated 1,4-naphthoquinone dissolved in a solvent.

4. An insecticidal composition containing as an active ingredient a methylated 1,4-naphthoquinone dissolved in a petroleum insecticide base by means of a mutual solvent.

5. An insecticidal composition containing as an active ingredient a methylated 1,4-napthoquinone dissolved in a petroleum insecticide base by means of a mutual solvent composed of a hydrocarbon oil rich in methylated naphthalene.

6. An insecticidal composition containing a methylated 1,4-naphthoquinone together with an inert dust.

7. An insecticidal composition containing a methylated 1,4-naphthoquinone dissolved in a solvent and extended therewith over an agricultural dust.

8. An insecticidal composition containing as an active ingredient 2-methyl-1,4-naphthoquinone dissolved in a petroleum insecticide base by means of a mutual solvent.

9. An insecticidal composition containing as an active ingredient 2-methyl-1,4-naphthoquinone dissolved in a petroleum insecticide base by means of a mutual solvent composed of a hydrocarbon oil rich in methylated naphthalene.

10. An insecticidal composition containing 2-methyl-1,4-naphthoquinone together with an inert dust.

11. An insecticidal composition containing 2-methyl-1,4-naphthoquinone dissolved in a solvent and extended therewith over an agricultural dust.

JULIUS HYMAN.